(12) United States Patent
Chou

(10) Patent No.: US 6,428,116 B1
(45) Date of Patent: Aug. 6, 2002

(54) BICYCLE WHEEL WITH V-SHAPED SPOKES

(75) Inventor: Joe Chou, Tai-Ping (TW)

(73) Assignee: Giant Manufacturing Co., Ltd., Taichung Hsien (TW)

( * ) Notice: Subject to any disclaimer, the term of this patent is extended or adjusted under 35 U.S.C. 154(b) by 0 days.

(21) Appl. No.: 09/862,085

(22) Filed: May 21, 2001

(51) Int. Cl.[7] .................................................. B60B 1/00
(52) U.S. Cl. ...................... 301/104; 301/64.704; 301/73
(58) Field of Search ........................ D12/209; 301/104, 301/64.704, 64.101, 64.701, 65, 64.102, 64.705, 79, 73, 57

(56) References Cited

U.S. PATENT DOCUMENTS

| | | | | |
|---|---|---|---|---|
| 3,473,847 A | * | 10/1969 | Krenz | 301/73 |
| 4,930,843 A | | 6/1990 | Lewis | |
| D368,464 S | * | 4/1996 | Morley et al. | D12/209 |
| 5,651,589 A | * | 7/1997 | Bradley | 301/79 |
| D414,738 S | * | 10/1999 | Escue | D12/209 |
| D427,555 S | * | 7/2000 | Hall | D12/209 |
| D432,973 S | * | 10/2000 | Fitzgerald | D12/209 |
| D433,370 S | * | 11/2000 | Hussaini et al. | D12/209 |
| 6,231,127 B1 | * | 5/2001 | Watters | 301/73 |
| D445,079 S | * | 7/2001 | Lee | D12/209 |
| D451,063 S | * | 11/2001 | Yoshida | D12/209 |
| D451,463 S | * | 12/2001 | Murkett et al. | D12/209 |
| D454,105 S | * | 3/2002 | Pfeiffer | D12/209 |

* cited by examiner

Primary Examiner—S. Joseph Morano
Assistant Examiner—Long Bao Nguyen
(74) Attorney, Agent, or Firm—Harness, Dickey & Pierce, P.L.C.

(57) ABSTRACT

A bicycle wheel includes an annular rim having an annular base wall, a hub shell surrounded by the annular base wall and having two opposite ends that are disposed at two opposite sides of the annular rim, and a plurality of unitary V-shaped spokes equiangularly spaced apart and extending from the hub shell to the annular base wall. Each of the V-shaped spokes has a tip end that is connected to the annular base wall, and two arms that diverge from the tip end and that have distal ends which are respectively connected to the opposite ends of the hub shell.

13 Claims, 7 Drawing Sheets

BICYCLE WHEEL WITH V-SHAPED SPOKES

BACKGROUND OF THE INVENTION

1. Field of the Invention

This invention relates to a bicycle wheel, more particularly to a bicycle wheel with V-shaped spokes.

2. Description of the Related Art

FIG. 1 illustrates a conventional bicycle wheel 1 disclosed in U.S. Pat. No. 4,930,843. The bicycle wheel 1 includes a rim 101, a hub 103, and four angularly spaced apart spokes 102 interconnecting the rim 101 and the hub 103. Since the spokes 102 are all connected to a middle portion of the hub 103, a much higher stress will act on the middle portion of the hub 103 than on the remaining portion of the hub 103 when the bicycle wheel 1 moves over the ground. As a consequence, the middle portion of the hub 103 tends to break after a period of use.

FIG. 2 illustrates another conventional bicycle wheel 2 which includes a rim 201, a hub 202, and a plurality of angularly spaced apart rod-like spokes 203 interconnecting the rim 201 and the hub 202. The bicycle wheel 2 is disadvantageous in that assembly thereof is laborious and time-consuming.

SUMMARY OF THE INVENTION

Therefore, it is an object of the present invention to provide a bicycle wheel having V-shaped spokes that are capable of overcoming the aforementioned drawbacks.

Accordingly, the bicycle wheel of the present invention comprises: an annular rim having an annular base wall; a hub shell surrounded by the annular base wall, defining a rotating axis of the annular rim, and having two opposite ends that are disposed at two opposite sides of the annular rim; and a plurality of unitary V-shaped spokes equiangularly spaced apart and extending from the hub shell to the annular base wall, each of the V-shaped spokes having a tip end that is connected to the annular base wall, and two arms that are joined at and that diverge from the tip end, and that have distal ends which are distal from the annular base wall, which are respectively connected to the opposite ends of the hub shell, and which are angularly offset from each other.

BRIEF DESCRIPTION OF THE DRAWINGS

In drawings which illustrate embodiments of the invention.

DETAILED DESCRIPTION OF THE PREFERRED EMBODIMENTS

Figure 1:
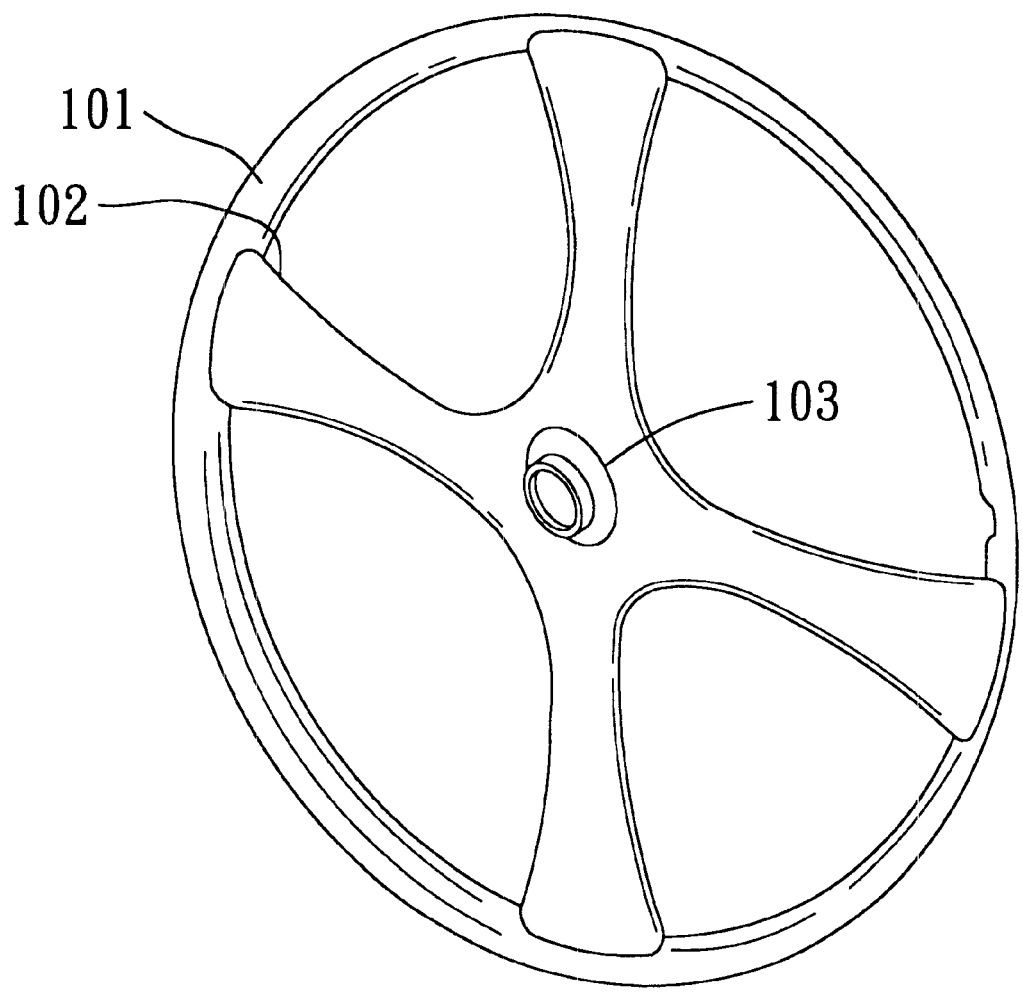
FIG. 1 illustrates a conventional bicycle wheel having a rim with spokes integrally formed thereon.
Figure 2:
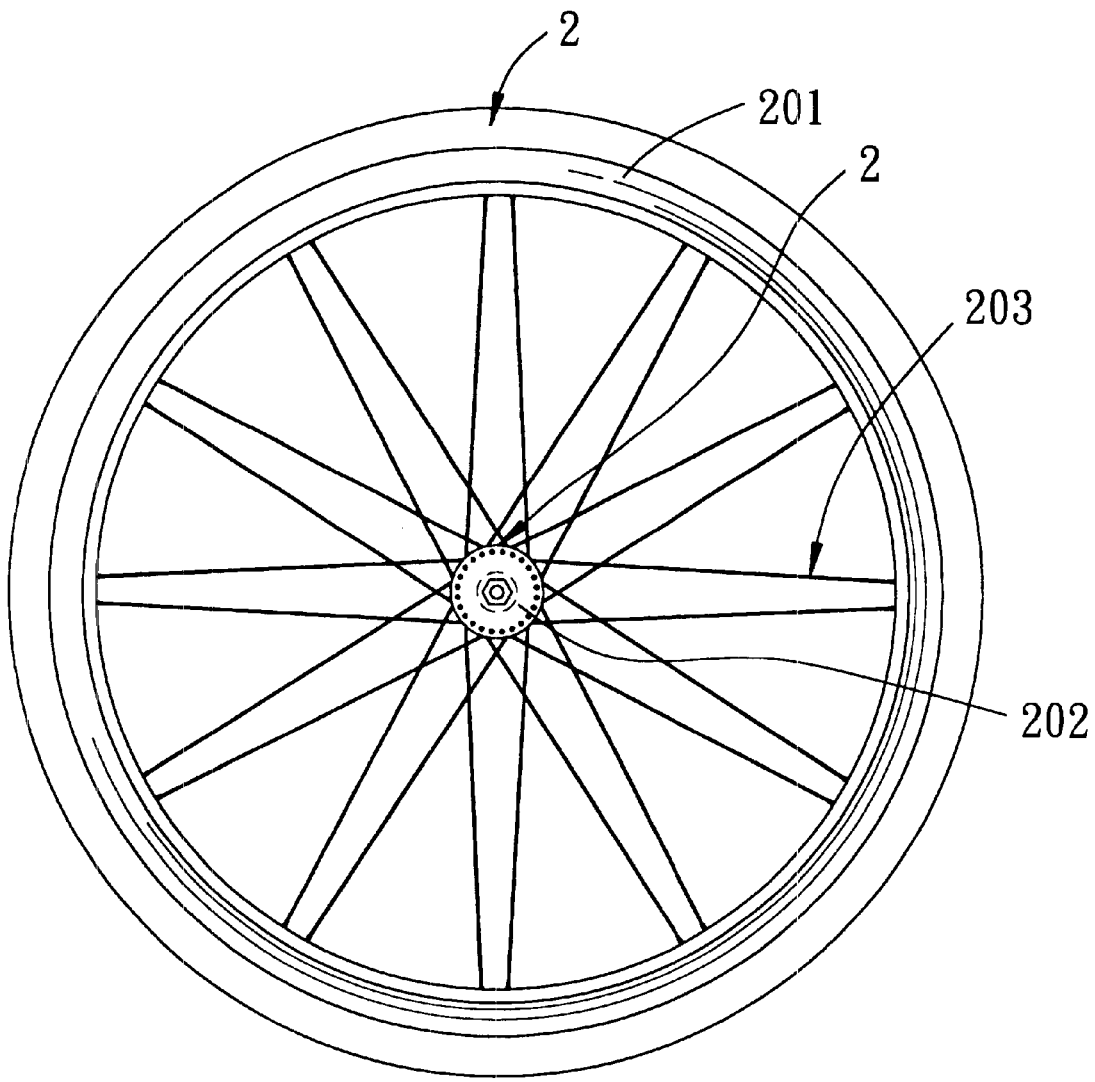
FIG. 2 illustrates another conventional bicycle wheel having a rim with a plurality of rod-like spokes connected thereto.
Figure 3:
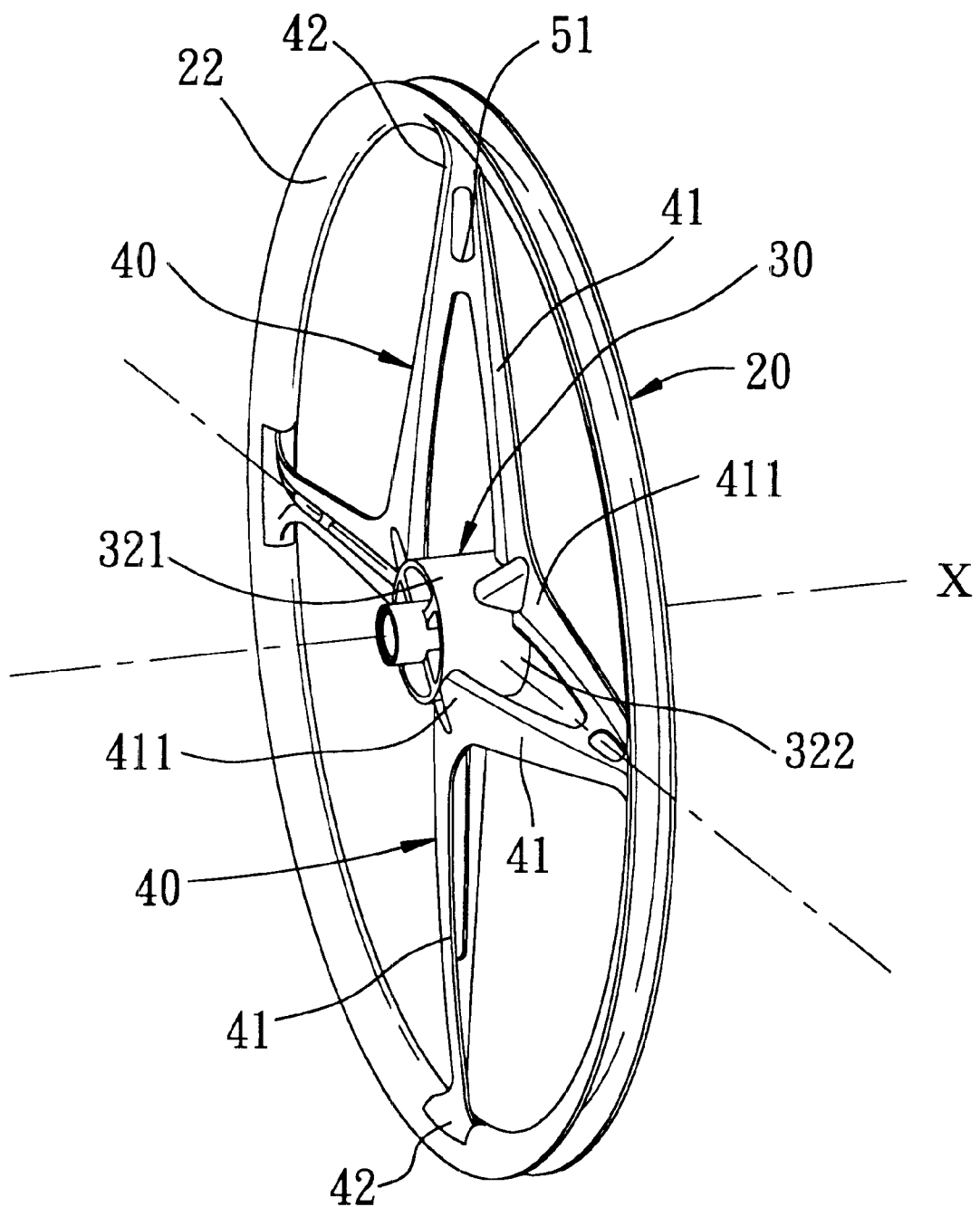
FIG. 3 is a perspective view of a preferred embodiment of a bicycle wheel of this invention, which has a rim and four spokes integrally formed thereon.
Figure 4:
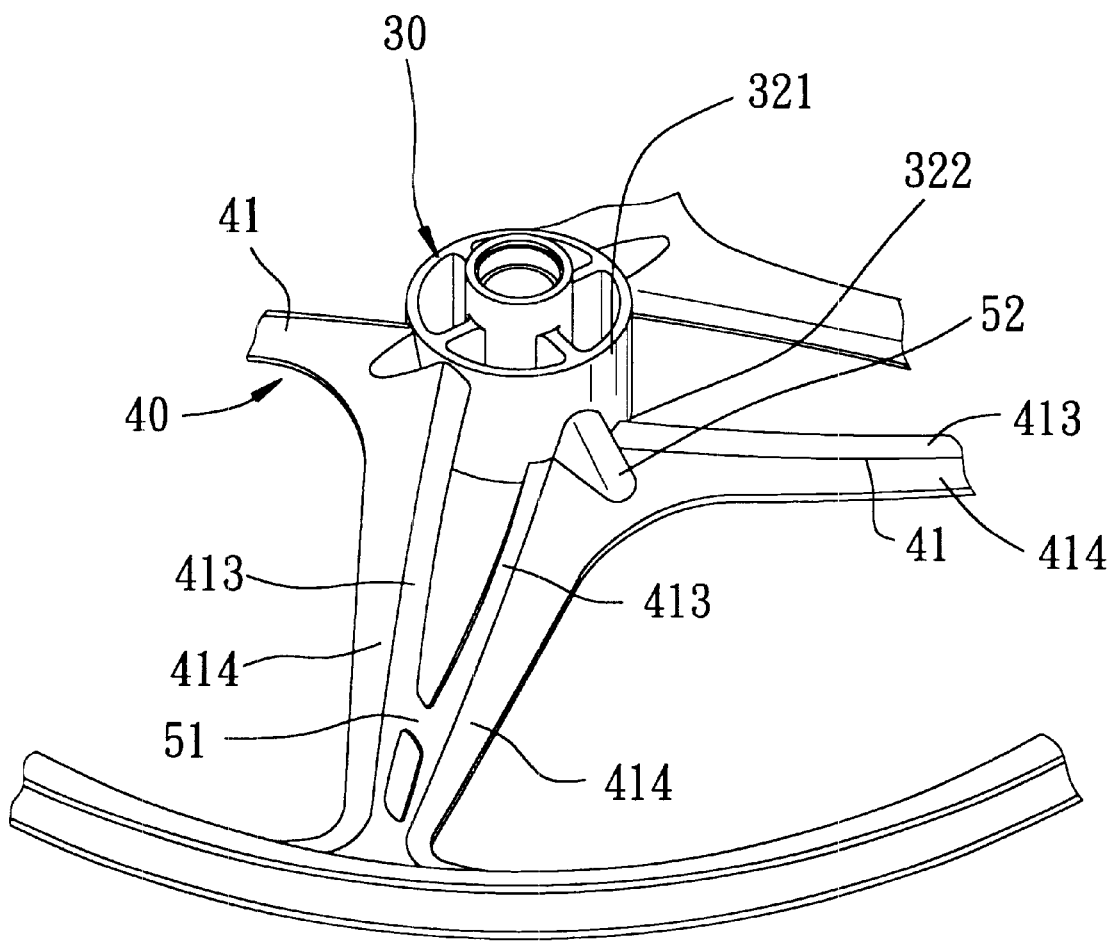
FIG. 4 is a fragmentary perspective view to illustrate configurations of the spokes of the bicycle wheel of FIG. 3.
Figure 5:
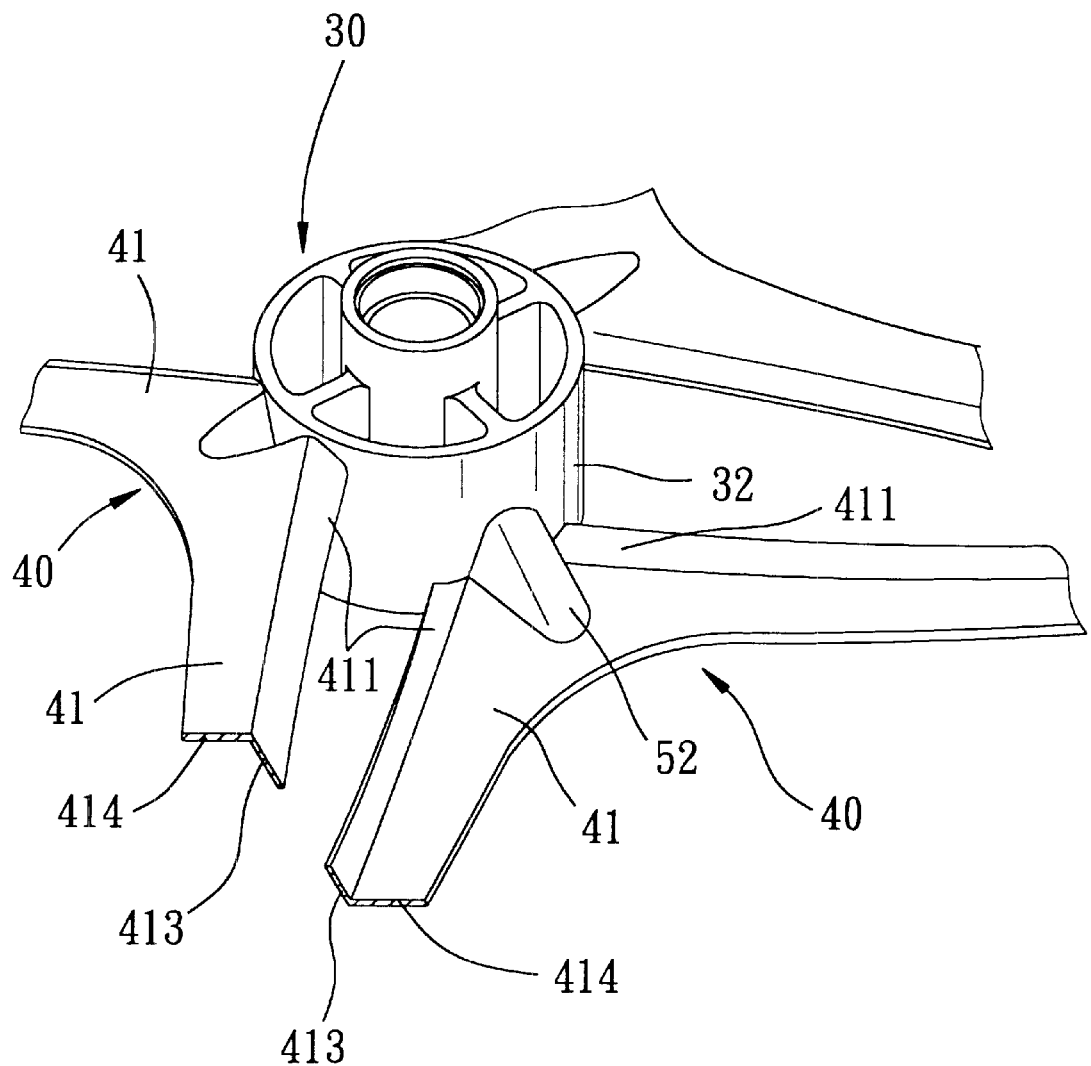
FIG. 5 is a fragmentary perspective view to illustrate a cross-section of each spoke of the bicycle wheel of FIG. 3.
Figure 6:
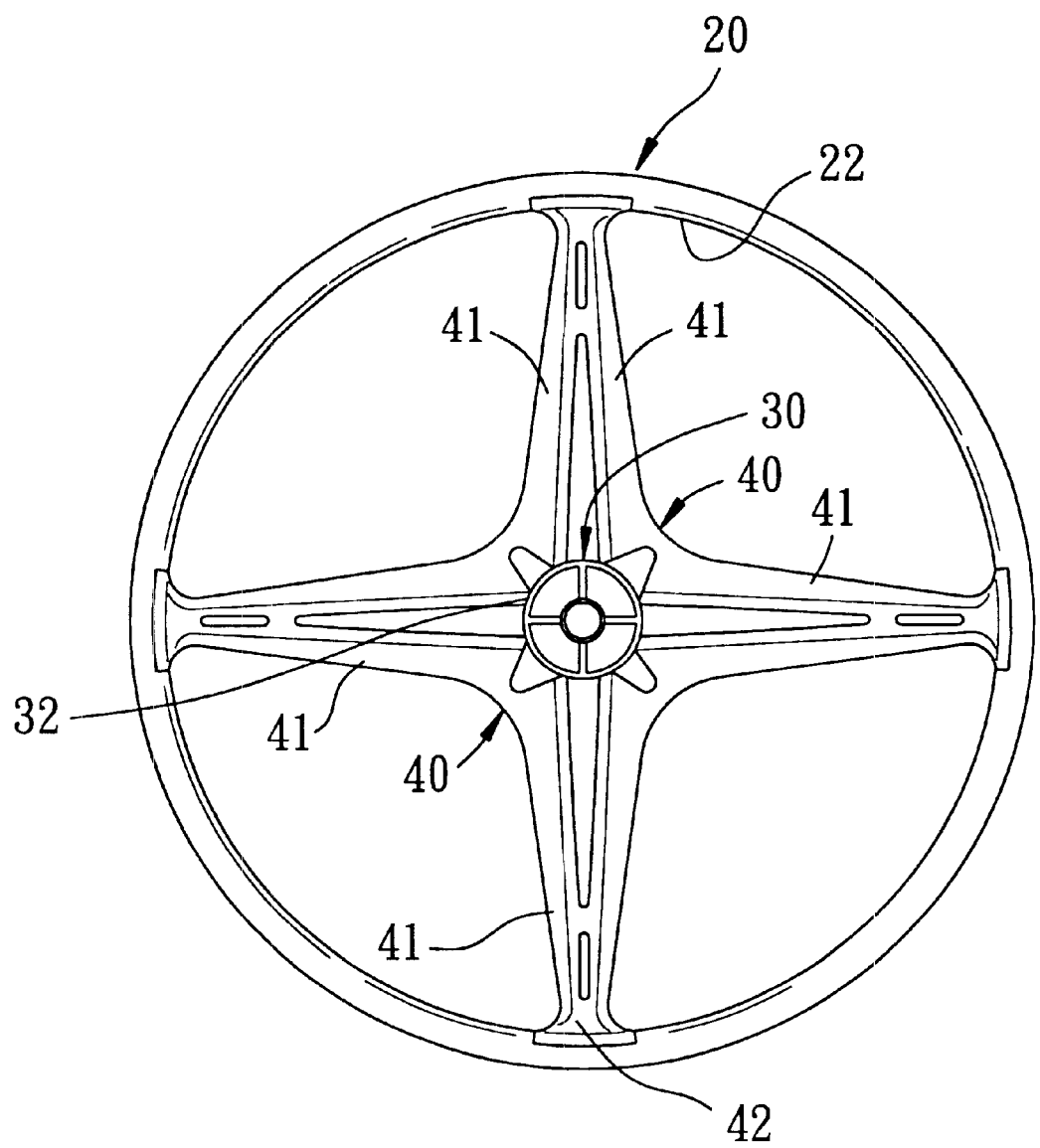
FIG. 6 is a side view of the bicycle wheel of FIG. 3.

FIGS. 3 to 6 illustrate a bicycle wheel embodying the present invention. The bicycle wheel includes: an annular rim 20 adapted to receive a bicycle tire (not shown) and having an annular base wall 22; a tubular hub shell 30 surrounded. by the annular base wall 22, defining a rotating axis (x) of the annular rim 20, and having two opposite ends 321, 322 that are disposed at two opposite sides of the annular rim 20; and a plurality of unitary V-shaped spokes 40 equiangularly spaced apart and extending from the hub shell 30 to the annular base wall 22. Each of the V-shaped spokes 40 has a tip end 42 that is connected to the annular base wall 22, and two arms 41 that are joined at and that diverge from the tip end 42, and that have distal ends 411 which are distal from the annular base wall 22, which are respectively connected to the opposite ends 321, 322 of the hub shell 30, and which are angularly offset from each other.

Preferably, the tip end 42 of each of the spokes 40 is integrally formed with the base wall 22 of the annular rim 20, whereas the distal ends 411 of the arms 41 of each of the spokes 40 are integrally formed with the hub shell 30. More preferably, the annular rim 20, the hub 30, and the spokes 40 are integrally formed using conventionial molding techniques.

Each two adjacent ones of the distal ends 411 of each two adjacent ones of the arms 41 of each two adjacent ones of the spokes 40 are disposed at the same one of the opposite ends 321, 322 of the hub shell 30 and are joined together thereat. A rib 51 interconnects the arms 41 of each spoke 40 and is disposed adjacent to the tip end 42 of each spoke 40 so as to reinforce each spoke 40 at the tip end 42.

A triangular block 52 is connected to each two adjacent ones of the distal ends 411 of each two adjacent ones of the arms 41 of each two adjacent ones of the spokes 40 and the hub shell 30 and projects outwardly therefrom so as to reinforce each spoke 40 at the distal ends 411.

Each of the arms 41 of each of the spokes 40 has an L-shaped cross-section, and has first and second portions 413, 414 that define the L-shaped cross-section. The first portions 413 of each spoke 40 extend oppositely and respectively from the opposite ends 321, 322 of the hub shell 30.

Preferably, the number of the spokes 40 is four.

Figure 7:
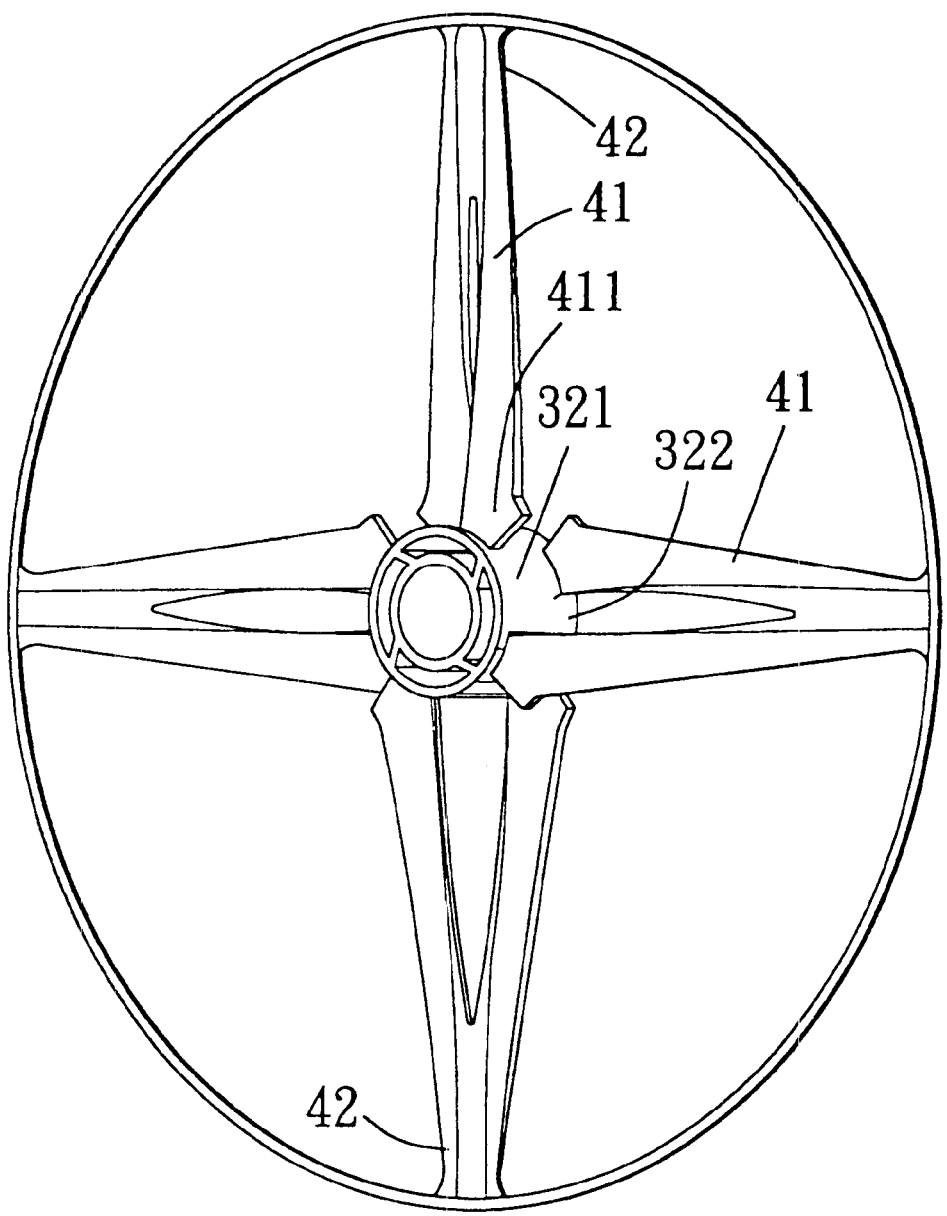
FIG. 7 is a perspective view of another preferred embodiment of the bicycle wheel of this invention.

FIG. 7 illustrates another preferred embodiment of the bicycle wheel modified from the previous embodiment. The main difference between the two embodiments is that instead of being disposed at the same one of the opposite ends 321, 322 of the hub shell 30, each two adjacent ones of the distal ends 411 of each two adjacent ones of the arms 41 of each two adjacent ones of the spokes 40 are respectively disposed at the opposite ends 321, 322 of the hub shell 30, and are angularly offset from each other.

With the design of the V-shaped spokes, the drawbacks associated with the prior art can be eliminated.

With the invention thus explained, it is apparent that various modifications and variations can be made without departing from the spirit of the present invention.

I claim:

1. A bicycle wheel comprising:
   an annular rim having an annular base wall;
   a hub shell surrounded by said annular base wall, defining a rotating axis of said annular rim, and having two opposite ends that are disposed at two opposite sides of said annular rim; and
   a plurality of unitary V-shaped spokes equiangularly spaced apart and extending from said hub shell to said annular base wall, each of said V-shaped spokes having a tip end that is connected to said annular base wall, and two arms that are joined at and that diverge from said tip end, and that have distal ends which are distal from said annular base wall, which are respectively connected to said opposite ends of said hub shell, and which are angularly offset from each other.

2. The bicycle wheel of claim 1, wherein said tip end of each of said spokes is integrally formed with said annular rim.

3. The bicycle wheel of claim 2, wherein said distal ends of said arms of each of said spokes are integrally formed with said hub shell.

4. The bicycle wheel of claim 1, wherein each two adjacent ones of said distal ends of each two adjacent ones of said arms of each two adjacent ones of said spokes are disposed at the same one of said opposite ends of said hub shell and are joined together thereat.

5. The bicycle wheel of claim 4, wherein said distal ends of said arms of each one of said spokes are integrally formed with said hub shell.

6. The bicycle wheel of claim 5, wherein said tip end of each of said spokes is integrally formed with said annular rim.

7. The bicycle wheel of claim 4, wherein each of said arms of each of said spokes has an L-shaped cross-section.

8. The bicycle wheel of claim 4, wherein each of said spokes further has a rib interconnecting said arms and disposed adjacent to said tip end.

9. The bicycle wheel of claim 4, further comprising a block connected to each two adjacent ones of said distal ends of each two adjacent ones of said arms of each two adjacent ones of said spokes and said hub shell and projecting outwardly therefrom.

10. The bicycle wheel of claim 4, wherein the number of said spokes is four.

11. The bicycle wheel of claim 1, wherein each two adjacent ones of said distal ends of each two adjacent ones of said arms of each two adjacent ones of said spokes are respectively disposed at said opposite ends of said hub shell, and are angularly offset from each other.

12. The bicycle wheel of claim 11, wherein said distal ends of said arms of each one of said spokes are integrally formed with said hub shell.

13. The bicycle wheel of claim 12, wherein said tip end of each of said spokes is integrally formed with said annular rim.

* * * * *